United States Patent [19]
Christensen et al.

[11] 3,990,516
[45] Nov. 9, 1976

[54] PNEUMATIC TIME DELAY VALVE

[75] Inventors: Bruce C. Christensen, Marinette, Wis.; Roy C. Emmes, Menominee, Mich.

[73] Assignee: The Ansul Company, Marinette, Wis.

[22] Filed: Oct. 8, 1975

[21] Appl. No.: 620,827

[52] U.S. Cl. .............................. 169/19; 137/509;
    137/599; 137/624.11
[51] Int. Cl.² ................. A62C 37/06; F16K 31/163
[58] Field of Search ................... 169/19, 20, 22, 60, 169/9, 16, 11; 137/509, 599, 624.11; 251/48

[56] References Cited
UNITED STATES PATENTS

| | | | |
|---|---|---|---|
| 2,410,375 | 10/1946 | Wright | 137/509 |
| 2,537,009 | 1/1951 | Allen et al. | 169/9 |
| 2,663,153 | 12/1953 | Grant, Jr. | 169/11 X |
| 2,758,657 | 8/1956 | Williamson et al. | 169/9 |
| 2,865,592 | 12/1958 | Schrank | 251/48 X |

Primary Examiner—Evon C. Blunk
Assistant Examiner—Andres Kashnikow
Attorney, Agent, or Firm—Morgan, Finnegan, Pine, Foley & Lee

[57] ABSTRACT

A valve body contains a coaxially slidably valve element with a seal member at the upstream end and a pair of differential area pistons at the other end. Fluid passage means direct fluid from the upstream end to a zone between the pistons to cause the pistons to seat the seal member. An orifice in the downstream, larger area piston bleeds fluid to an accumulator of preselected volume. Once the pressure forces on the large piston balance, the pressure force on the small piston unseat the seal member.

10 Claims, 3 Drawing Figures

PNEUMATIC TIME DELAY VALVE

BACKGROUND OF THE INVENTION

The present invention relates to the field of pneumatic valves and more particularly to a time delay valve for controlling the discharge of a fluid medium, such as a fire suppressant medium.

With the ever increasing use of fully integrated fire suppressant systems which despense suppressant agents such as $CO_2$ or Halon over an area under surveillance, a need has arisen for a low cost, easily maintained time delay apparatus for operating the system. The time delay of a short period in the order of 60 seconds is necessary to allow the area to be evacuated by personnel prior to discharge of the suppressant and to allow the discharge operation to be countermanded, if it was unnecessarily activated. This latter point is particularly important where the discharge of suppressant would severly damage equipment, such as electronics and particularly computers.

Time delay mechanisms for use in suppressant systems have been proposed in the past by have not adequately fulfilled the needs of the industry. These delay mechanisms are inadequate for various reasons including depending on external electrical power which may fail during a fire emergency requiring pressure regulation or depending on a complex arrangement of springs and diaphragms which must be continuously checked and maintained to assure proper functioning. See, for example, Williamson et al., U.S. Pat. No. 2,758,657.

Allen et al., U.S. Pat. No. 2,537,009 discloses a time delay valve in which the fluid is first bled into a storage chamber, then into a second actuation storage chamber which, after pressurization moves a valve to release the fluid in the first chamber to unseat the control valve. Fluid flow through the device is controlled by a complex array of spring loaded slide valves.

Schrank, U.S. Pat. No. 2,865,592 discloses a delayed action valve which uses carbon dioxide pressure to operate a piston valve. The gas is fed through a metering tube into a storage container until sufficient pressure builds up to operate the spring loaded dispensing valve. Similarly, Ludwig U.S. Pat. No. 3,256,906 discloses a bi-directional, spring loaded delay valve for air circuits.

Finally, Grant U.S. Pat. No. 2,663,153 discloses a fluid pressure operated spring loaded valve which utilizes an accumulator receptacle that is pressurized until the set pressure for operating the dispensing valve is reached.

SUMMARY OF THE INVENTION

The present invention overcomes the complexities of the prior art and provides a time delay valve which is operated directly by the fluid medium to provide a reliable, low cost device which is easily maintained and is pressure independent.

Briefly, the pneumatic time delay valve includes a valve body, and a slidably mounted valve therein. One end (the upstream end) of the valve body is adapted to be connected to a source of fluid. Fluid as used herein refers to both gaseous and liquid mediums. The opposite end of the valve body is adapted to be connected to an accumulator tank. The interior of the valve body defines a seat adjacent upstream end, an intermediate discharge chamber including a discharge passage extending through the side of the valve body and a downstream double piston cylinder portion. The double cylinder portion includes a first cylinder and a second, larger diameter, coaxial cylinder.

The slidably mounted valve includes a seal member, adapted to engage and seal with the seat, a longitudinal stem portion extending therefrom, and a double ended differential piston at the opposite end. The piston includes a pair of generally conical shaped inwardly opposited pistons. The smaller piston is positioned in sealing engagement with the first cylinder and the larger piston is sealably engaged with the second cylinder and is provided with a bleed orifice.

The valve body includes a longitudinal passage in fluid communication with the upstream end and having a discharge port in the cylinder portion of the valve body. The discharge port is positioned to feed fluid between the pistons, thus moving the valve to the seated position. As the fluid bleeds through the larger piston, the pressure across that piston equalizes and the force created on the smaller piston moves the valve to the unseated or open position.

DETAILED DESCRIPTION OF A PREFERRED EMBODIMENT

Figure 1:
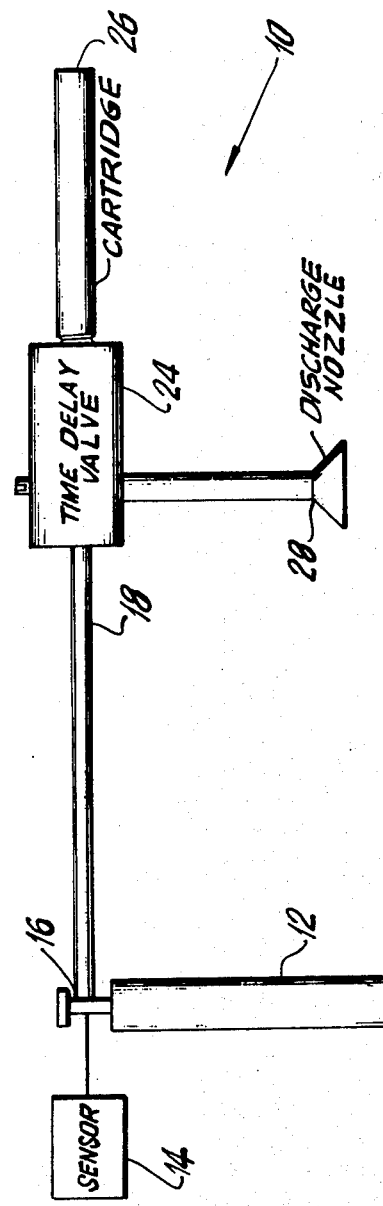
FIG. 1 is a schematic of a fire suppressant system incorporating a time delay valve of the present invention.

FIG. 1 illustrates a fire suppressant system 10 which includes a pneumatic time delay valve of the present invention. System 10 includes a pressurized source 12 of fire suppressant fluid, such as a $CO_2$ container, a fire sensor 14 which, after sensing the presence of heat or smoke, opens container valve 16 to release the pressurized fluid from container 12.

Fluid as used herein refers to both pressurized liquid and gas. Additionally, although the time delay valve is described with reference to a fire suppressant system, it may also be used with other pneumatic systems requiring a time delay element.

Fluid from container 12 passes through line 18 to time delay valve 24. A portion of the pressurized fluid is bled through valve 24 to a cartridge accumulator 26, as described in greater detail below. Accumulator 26 may be directly coupled to valve 24, as illustrated, or coupled thereto by means of tubing. After the time delay has been achieved to allow personnel to evacuate the area, valve 24 dispenses the fire suppressant fluid through a discharge nozzle 28 coupled thereto. Discharge nozzle 28 may be a single nozzle head or a plurality of nozzle heads fed from a common manifold which is charged by valve 24.

Figure 2:
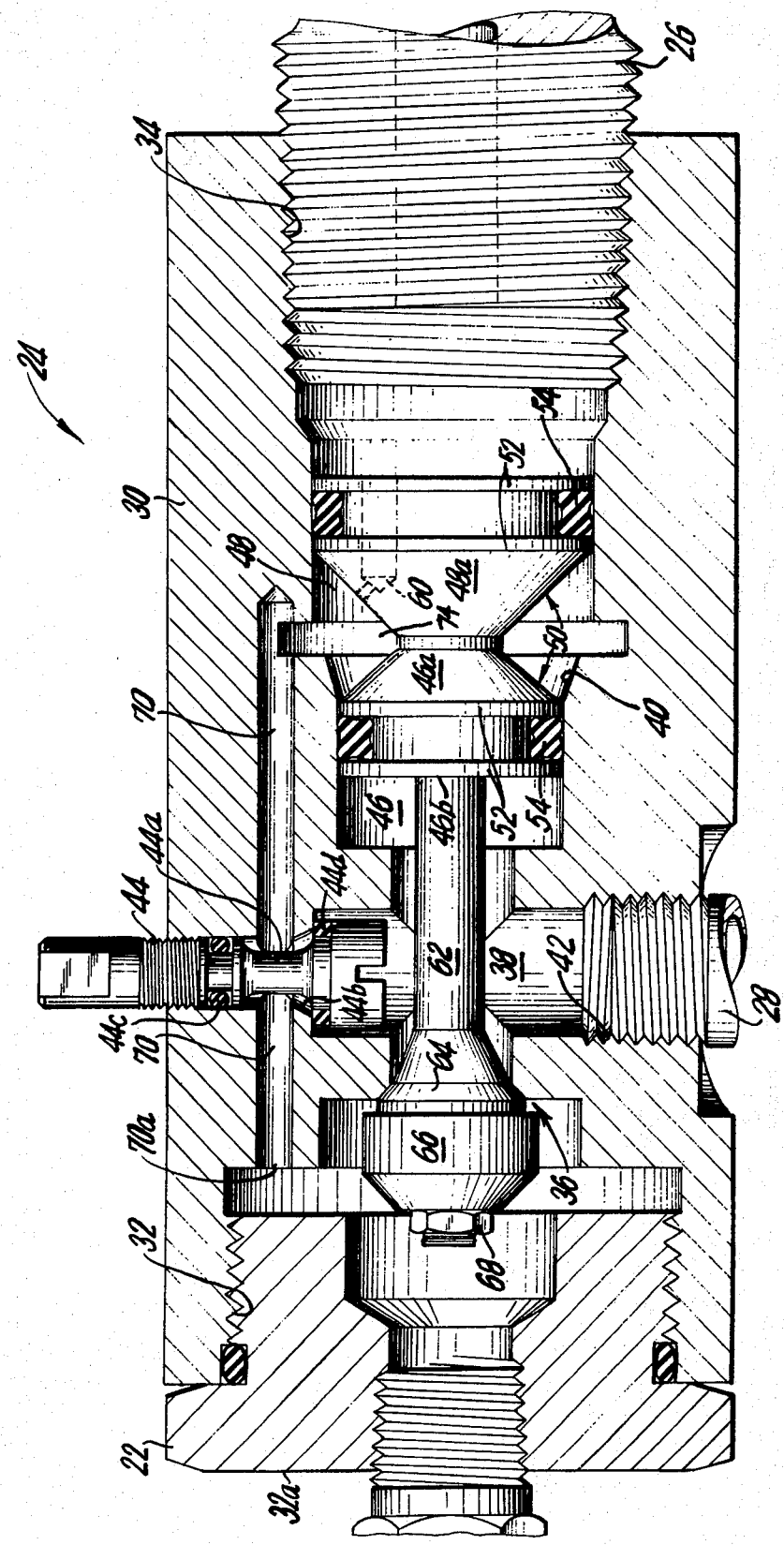

FIG. 2 illustrates valve 24 in the closed or seated position. For clarify of illustration, the pressurized fluid is not illustrated although its operation will be described. Valve 24 includes an elongate valve body 30 having an internally threaded upstream end 32, which couples to line 18 by means of adaptor and nipple assembly 32a, and internally threaded downstream end 34, which couples to accumulator 26.

Extending between the ends of the body is a coaxial chamber portion which includes an annular shoulder seat 36 adjacent to the upstream end 32, an intermediate chamber 38, and a differential area, double cylinder portion 40, adjacent to the downstream end 34. Chamber 38 includes transverse threaded passage 42 in which discharge nozzle 28 is coupled, and a manually operated by-pass valve 44, described in greater detail below.

Cylinder portion 40 includes a pair of cylinders, namely a first cylinder 46 and a second cylinder 48, coaxial with and having a larger cross-section area than cylinder 46. A pair of tandem piston 46a and 48a are slidably positioned in cylinder 46 and 48, respectively. Each piston includes a conical shaped surface which is in abutting relationship with the conical surface of the other piston to form a receiving zone 50 between the pistons. The conical shape of the piston is illustrative only, since it is apparent that other shapes including planar may also be used. Each piston includes a pair of spaced apart lands 52 which position and carry an annular seal member 54, thereby placing each piston in sealing relationship with its associated cylinder wall.

The second or larger piston 48a includes a bleed orifice 60 which extends through the piston and permits pressurized fluid to pass into accummulator 26, as described below. Extending in the upstream direction from piston 46a is a valve stem 62, which bridges chamber 38, and carries a seal element 64 at the opposite end. Seal element 64 is carried by means of a retainer 66 secured to stem 62 by fastener 68. Shoulder 36 and seal element 64 are tapered complimentarily to provide a seal contact area there-between.

A fluid passage 70 extends longitudinally within body 30 from the upstream end 32 of the valve to the cylinder portion 40. Passage 70 is in fluid communication with upstream end 32 by means of port 70a. Passage 70 is arranged to discharge pressurized fluid into zone 50 through a transverse disc shaped passage 74, which is in fluid communication therewith and circumscribes the piston chamber. In this manner, when pressurized fluid is released from container 12, it flows through line 18 into passage 70, through disc passage 74 into the zone 50 between the differential pistons. Due to the differential area between pistons 48 and 46, the valve is moved to the seated position, FIG. 2. A portion of the fluid is bled through piston 48a by orifice 60 to accummulator 26. When the pressure forces on seal body 66 and the differential area of the piston equalize with the pressure force on the large piston due to the build-up in accummulator pressure, the pressure force on piston 46a moves the valve to the open position, FIG. 3. When the seal element 64 is moved out of engagement with shoulder 36, the fluid passes through chamber 38 and into discharge nozzle 28.

By selecting the proper orifice diameter and accummulator tank volume, any delay time can be accommodated by valve 24. By way of illustration, a $CO_2$ container at vapor pressure of 825–1,000 p.s.i. and time delay valve with an orifice diameter of 0.0145 inches needed an accummulator volume of about 127 cubic inches to provide a 60 second time delay with a 17 inch pipe separation between $CO_2$ container and accummulator. The effective diameter of the pistons 46a and 48a were about 0.79 inch and 1.0 inch respectively to yield a ratio of areas of about 0.62.

Figure 3:
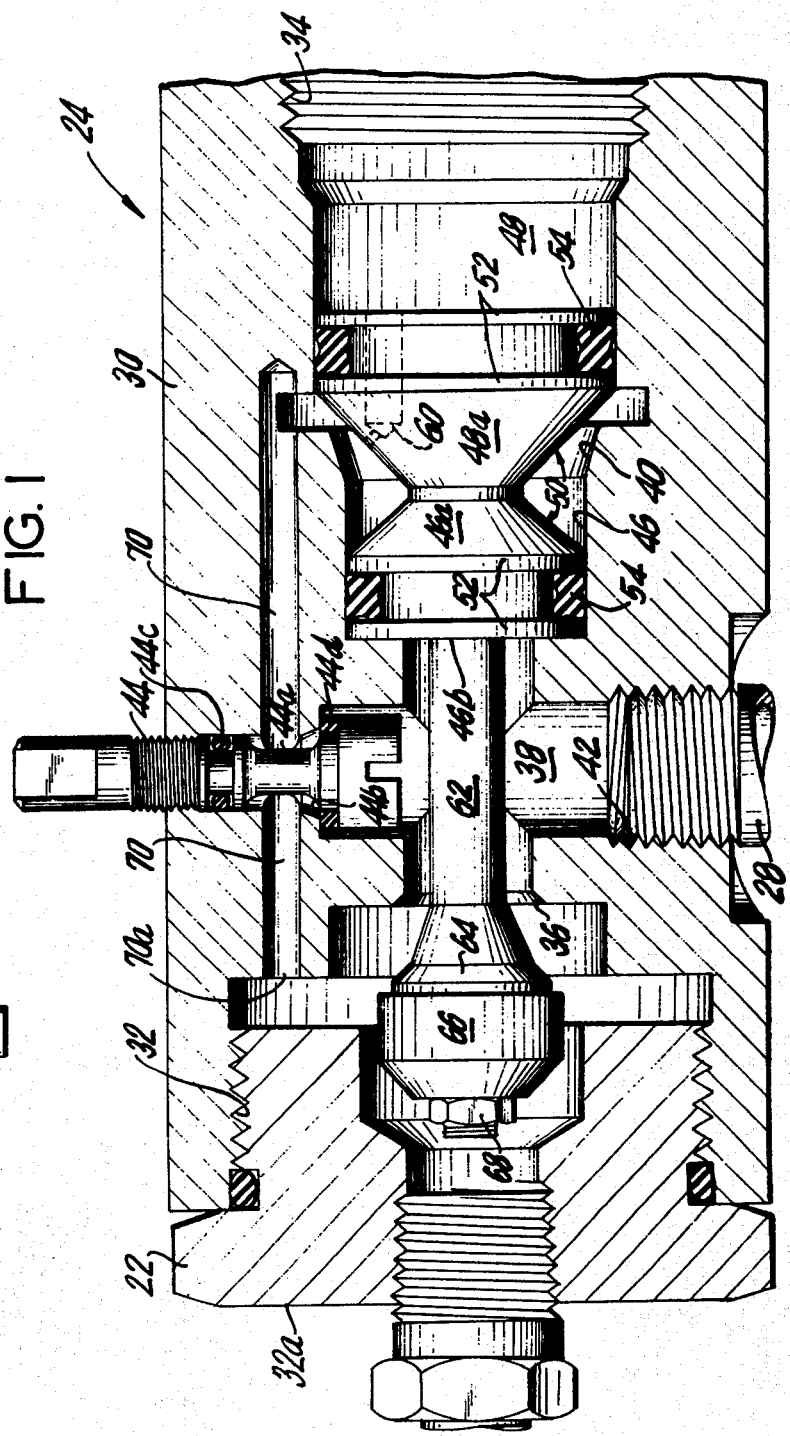
FIGS. 2 and 3 are enlarged, fragmentary, longitudinal cross-sectional views of a time delay valve illustrating the valve spool in the seated and unseated positions, respectively.

As best illustrated in FIG. 3, passage 74 is located to continuously charge zone 50 even when the valve is moved to the unseated position. The upstream end 46b of piston 46 a abuts against the end of cylinder 46 in the discharge position.

In the event that it is necessary to by-pass the time delay feature of the valve 24, a manual by-pass valve 44 is provided. Valve 44 is a one-piece structure which is threadably engaged to the body 30. The interior end is in the form of a spool 44a which passes transversely of passage 70 within an enlarged chamber 44b. Chamber 44b is in fluid tight relationship with passage 70 by means of an O-ring 44c and seal washer 44d carried by spool 44a. Valve 44 is turned to thread outwardly and bring washer 44d into sealing relation with the body of the valve. To by-pass, valve 44 is turned inwardly to unseat seal washer 44d, thereby permitting fluid to flow around spool 44a and into chamber 38 for dispensing.

From the above description it will be understood that the present invention provides a time delay valve of simple and rugged construction. Moreover, due to the differential piston, a fluid pressure independence within the valve itself is created, thereby making it readily adapted for use in a wide variety of systems operated at different pressure levels.

What is claimed is:

1. A pneumatic time delay valve comprising an elongate valve body having inlet and outlet; a chamber within said body interconnecting said inlet and outlet, said chamber defining a coaxial seat adjacent to the inlet, intermediate portion, and a coaxial cylinder portion adjacent to the outlet; a discharge passage in communication with said intermediate portion; said cylinder portion including a first cylinder and second cylinder, said second cylinder having a larger diameter than said first cylinder; a valve member coaxial disposed within said chamber, said valve member including sealing means arranged to seal with said seat, a stem extending from said sealing means to bridge said intermediate portion and mounting first and second pistons, in said first and second cylinders, respectively; said pistons defining a charging zone therebetween and said second piston defining a bleed orifice therethrough; and fluid passage means in fluid communication with said inlet and having discharge means arranged to continuously charge said zone between the pistons.

2. The valve of claim 1, wherein said first and second pistons have outwardly tapered surfaces in abutting relationships to form said charging zone.

3. The valve of claim 1, wherein said fluid passage discharge means includes a disc shaped passage circumscribing said second cylinder.

4. The valve of claim 1, wherein the ratio of the pressure areas of said differential pistons is about 0.62.

5. The valve of claim 4, wherein said bleed orifice is about 0.0145 inch in diameter.

6. In a fire suppressant system having a source of pressurized fire suppressant fluid and discharge nozzle means, the improvement which comprises a time delay valve and accumulator tank of predetermined volume interposed between said source and discharge nozzle means, said valve comprising an elongate body having an inlet in fluid communication with said source, and an outlet in fluid communication with the tank; and a chamber within said body interconnecting said inlet and outlet, said chamber defining a discharge passage in fluid communication with said discharge nozzle means, a coaxial seat adjacent said inlet and a cylinder portion adjacent said outlet, said cylinder portion including a first cylinder and a second cylinder, said second cylinder having a larger diameter than said first cylinder; a valve member coaxially disposed in said body, said valve member including sealing means arranged to seal with said seat, a stem extending from said sealing means through said chamber and mounting first and second pistons within said first and second cylinders, said pistons defining a charging zone therebetween and said second piston defining a bleed orifice therethrough to said outlet; and fluid passage means in fluid communication with said inlet and having a discharge port in said cylinder portion to charge said charge zone between the pistons, whereby, when fluid is released from said source said pistons close said valve and bleed fluid into the accummulator for a predetermined time delay and after pressure balances across said valve member the member moves to open said sealing member to discharge fluid.

7. The system of claim 6, wherein said piston area ratio is about 0.62.

8. The system of claim 7, wherein said accummulator tank volume is about 127 cubic inches.

9. The system of claim 7, wherein said orifice is about 0.0145 inch in diameter.

10. The system of claim 6, wherein said time delay is about 60 seconds.

* * * * *